Sept. 21, 1926.  
F. K. MURPHY ET AL  
1,600,771  
FLUID OPERABLE LUBRICATOR AND FEEDER FOR ENGINES  
Filed July 6, 1925
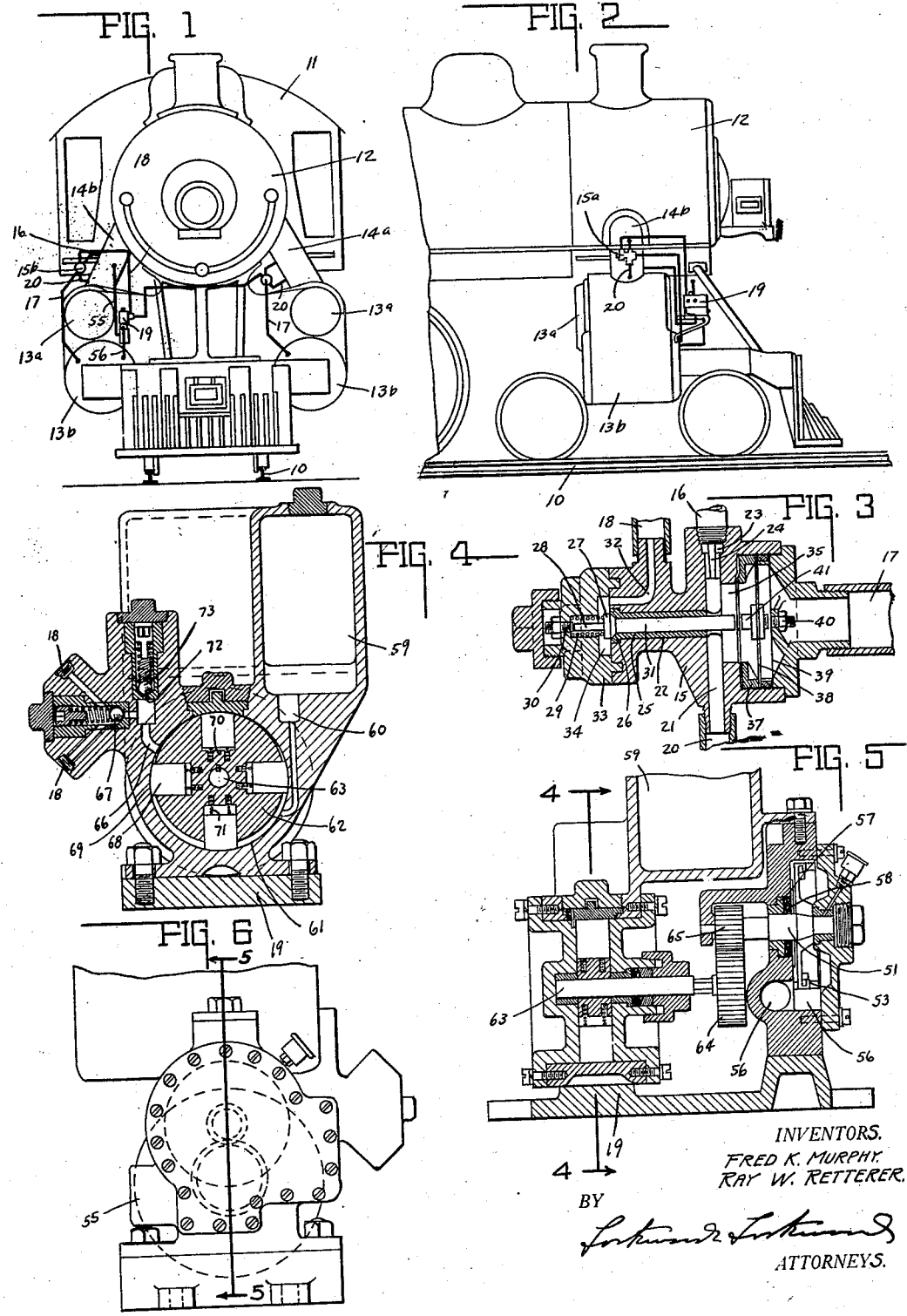
INVENTORS.  
FRED K. MURPHY.  
RAY W. RETTERER.  
BY  
ATTORNEYS.

Patented Sept. 21, 1926.

1,600,771

UNITED STATES PATENT OFFICE.

FRED K. MURPHY AND RAY W. RETTERER, OF INDIANAPOLIS, INDIANA.

FLUID-OPERABLE LUBRICATOR AND FEEDER FOR ENGINES.

Application filed July 6, 1925. Serial No. 41,772.

This invention relates to a force feed lubricator and distributor for locomotives and stationary engines.

The chief object of the invention is to provide a positive supply of lubricant to an engine of the stationary or locomotive type only when the moving parts thereof are moving under the influence of fluid pressure that is doing work.

The chief feature of the invention consists in the operation of a forced feed lubricator by constantly applied fluid pressure employed in the prime mover and associating therewith a distributor of a novel character also operable by fluid pressure employed in the prime mover. In the latter instance the distributor is operable by the differential diaphragm pressures, the larger diaphragm being associated with the lower pressure which is intermittently applied.

The full nature of the invention will be understood from the accompanying drawings and the following description and claims:

In the drawings Fig. 1 is a front view of a locomotive showing the invention associated therewith, the several parts of the piping being shown diagrammatically. Fig. 2 is a side elevational view of the same. Fig. 3 is a central sectional view through the distributor. Fig. 4 is a sectional view taken on line 4—4 of Fig. 5 and in the direction of the arrows and is of the lubricator. Fig. 5 is a longitudinal sectional view taken on line 5—5 of Fig. 6 and in the direction of the arrows and is of the lubricator and the power unit directly connected thereto. Fig. 6 is an end elevation of the lubricator, the turbine construction being shown dotted.

In the drawings 11 indicates a locomotive having a boiler 12, cylinders $13^a$ and $13^b$ and supply lines $14^a$ and $14^b$. Associated with each supply line is a distributor herein indicated respectively by the numerals $15^a$ and $15^b$.

Each distributor is connected by a conduit 16 to the source of high pressure steam, towit, the conduit 14. A conduit 17 is connected to the distributor at one end and to the engine cylinder supply at the other, thus subjecting the distributor to intermittent pressure. A conduit 18 is connected to the lubricator indicated generally by the numeral 19. Said conduit 18 constitutes a high pressure lubricant supply line and serves to supply oil from the lubricator to the distributor 15. A line 20 connects the distributor to the supply line connected to the cylinder and thus the lines 16 and 20 are connected through the distributor and form a by-pass leading from and thence to the supply line 14 of the engine.

Reference will now be had to Fig. 3, wherein the details of the distributor device are shown. The body portion indicated generally by the numeral 15 includes a pair of transverse communicating channels 21 and 22. The channel 21 communicates at one end with conduit 16 and at the other end with the conduit 20. A bushing 23 has a tapered outlet or passage 24 discharging into said passage 21. The channel 22 receives a sleeve 25 which terminates at the end opposite from the end communicating with the conduit 21 in a valve seat 26. A valve 27 is associated therewith and carries a stem 28 for aligning the coil spring 29 and abutting an adjustable stop 30. The valve 27 also is extended and carries a body portion 31 that has a predetermined fit within said sleeve 25. A channel 32 communicates with conduit 18 at one end and thus the lubricator and is supplied with lubricant under high pressure. The cap 33 carried by the distributor 15 includes a valve chamber 34 and this valve chamber communicates with the conduit 21 when the valve 27 is removed from its seat 26 through the predetermined fit between the stem 31 and the sleeve 25.

The opposite end of the body 15 includes a chamber 35 in which is secured a diaphragm 36 retained in position by a retainer 37, in turn supporting another diaphragm 38, likewise retained in position within a chamber 39. An adjustable stop 40 is provided for the diaphragm 38 and a stop 41 carried by the diaphragm 38 has engagement with diaphragm 36.

The operation of the distributor device is as follows: Whenever steam is supplied to the engine cylinder, and preferably the front end, and this occurs intermittently, pressure is applied to chamber 39. Diaphragm 38 moves toward the left with abutment 41. This engages diaphragm 36 and moves the same to engage the end of the stem 31 and unseat the valve 27 from its seat 26. This permits the lubricant supplied by line 18 under high pressure, to pass from the valve chamber 34 to the passage 21.

High pressure steam also is passed through the body 15 from conduit 16 to conduit 20. Through the nozzle arrangement and jet action, the steam carries with it a predetermined amount of oil determinable by the fit and travel of stem 31 in bushing 22 and by the regulated opening of the valve, the latter being adjusted through abutment 30. When the steam pressure supplied to the chamber 39 is released by being exhausted to the atmosphere or passed into a low pressure cylinder or to accessories as is the common practice, the diaphragm 36 becomes effective and returns diaphragm 38 to its original position. Said diaphragms are limited in their travel to the right by abutment 41 and the adjustable stop 40. At the same time, the spring 29 has seated the valve 27 and the lubricant supply is discontinued. Upon failure of the steam supply it will be readily apparent that the spring 29 cuts off the lubricant supply. Thus the distributor is adapted to withhold the lubricant from the device at such times as the movable parts are not movable under fluid pressure.

Reference will now be had to Figs. 4 to 6 inclusive wherein the lubricator 19 is illustrated. The lubricator 19 is connected by the conduits 18 to the distributors previously described.

Said lubricator includes a power unit which contains a chamber 50 in which is rotatably supported a shaft 51 carrying a wheel 52 provided with turbine vanes or blades 53 upon the periphery or side thereof. A nozzle 54 is connected by a line 55 to the source of high pressure steam, towit, the supply pipe or conduit 14. The steam, after engaging the turbine blades and causing the turbine wheel to rotate, passes outwardly and exhausts through the port or passage 56. This is connected to the exhaust pipe of the engine, or the same may be connected to a low pressure cylinder, atmosphere or to accessories as is the customary practice.

The lubricator housing 19 supports or includes a lubricant containing reservoir 59 which through a conduit 60, preferably check controlled, communicates with a pump chamber 61 cylindrical in outline. A rotatable cylindrical piston 62 is eccentrically mounted within the cylindrical chamber 61 and is carried by the shaft 63, which shaft see Fig. 5 supports a gear 64 that meshes with a pinion 65 carried by shaft 51. This is for gear reduction purposes. The discharge conduit 66 is check controlled as at 67 and communicates with the several conduits 18. The positions of the inlet and outlet 60 and 66 with respect to the cylindrical chamber 61 may be of any desired angular displacement. Likewise if desired, a valve mechanism may be associated with the wall of the cylindrical chamber for shifting the point of discharge, or the intake, or both as desired. The rotatable eccentrically mounted cylinder 62 is provided with a suitable number of reciprocating pistons or vanes 68. These constitute square plugs with arcuate faces 69 for engaging the cylindrical wall. The cylindrical piston 62 is apertured and supports a boss concentric therewith as at 70 around which is seated a coil spring 71 that bears at its outer end against the rear face of the plunger or plugs 68 for normally forcing the arcuate face 69 into engagement with the cylindrical wall. The operating face of the pistons 69 is the exposed portion which varies. It will of course be recognized that if the intake is that beyond where the piston 68 has the greatest exposed lateral area, the amount of lubricant received in the space between two adjacent pistons will be the greatest. As the cylindrical piston 62 rotates the area of the resultant chamber between the two adjacent lubricating pistons decreases and thus the pressure increases under the well known law of $P \times V = R \times T$. Thus the pressure is inversely as the volume.

A by-pass is provided at 72 which is check controlled as at 73 and this operates as a relief valve and discharges surplus lubricant to the reservoir.

From the foregoing it will be noted that the lubricator and distributor devices are so arranged that the high pressures are all contained within enclosed casings and the lubricator and distributor parts are what may be termed directly connected together, thereby eliminating the necessity of the innumerable stuffing boxes and the like heretofore required. If desired shafts 51 and 63 may be coaxial and integral, in which event, no stuffing boxes will be required, merely a packed partition between chambers 61 and 50.

The invention claimed is:

In a lubricating system for fluid operable engines, the combination with a source of high pressure fluid and a source of lower pressure fluid, of a pressure lubricator including an eccentrically mounted rotatable piston, a fluid operable turbine therefore and connected thereto, and a distributor connected to the lubricator and to the parts to be lubricated and the high pressure fluid source including means differentially subjected to both fluid pressure sources.

In witness whereof, we have hereunto affixed our signatures.

FRED K. MURPHY.
RAY W. RETTERER.